US012807030B2

(12) United States Patent
Peterson

(10) Patent No.: US 12,807,030 B2
(45) Date of Patent: Nov. 24, 2026

(54) MOBILE EQUIPMENT OPTIMIZED TO SUPPORT SWAPPABLE BATTERY MACHINERY

(71) Applicant: Caterpillar Inc., Peoria, IL (US)

(72) Inventor: Grant Steven Peterson, Metamora, IL (US)

(73) Assignee: Caterpillar Inc., Peoria, IL (US)

(*) Notice: Subject to any disclaimer, the term of this patent is extended or adjusted under 35 U.S.C. 154(b) by 280 days.

(21) Appl. No.: 18/236,706

(22) Filed: Aug. 22, 2023

(65) Prior Publication Data

US 2025/0065770 A1 Feb. 27, 2025

(51) Int. Cl.
*B60L 53/80* (2019.01)
*B60L 53/12* (2019.01)

(52) U.S. Cl.
CPC ............... *B60L 53/80* (2019.02); *B60L 53/12* (2019.02)

(58) Field of Classification Search
CPC ................................. B60L 53/80; B60L 53/12
See application file for complete search history.

(56) References Cited

U.S. PATENT DOCUMENTS 3,834,563 A * 9/1974 Teti ......................... B60L 53/80 180/68.5
5,301,765 A * 4/1994 Swanson .................. B60K 1/04 180/68.5
5,612,606 A 3/1997 Guimarin
10,340,709 B2 7/2019 Dyer et al.
10,988,025 B2 * 4/2021 Neander ................. H02J 50/10
11,276,890 B2 * 3/2022 Dyer ....................... B60L 1/003
2023/0021364 A1 * 1/2023 Hirano .................... B60L 53/12
2023/0102029 A1 * 3/2023 Huff ......................... B60K 1/04 180/65.1
2023/0174008 A1 * 6/2023 Lowe ................... B60H 1/3232 62/236
2023/0256849 A1 * 8/2023 Messina .................. B60L 53/12 180/65.31

FOREIGN PATENT DOCUMENTS

CN 104118402 A 10/2014
CN 107697037 A 2/2018
CN 212921200 U 4/2021
WO 2018076852 A1 5/2018
WO 2020033474 A1 2/2020

* cited by examiner

*Primary Examiner* — Kurt Philip Liethen

(57) ABSTRACT

Typically, the battery swapping process of a battery-powered mobile equipment involves driving or otherwise moving and transporting the battery pack of the mobile equipment at the recharging station, and support mobile equipment may not be properly equipped to perform an efficient and safe battery swap. The availability of mobile equipment designed to replace battery packs on-site are limited and may not be suitable for most battery pack assemblies. Disclosed embodiments eliminate or reduce the risk during the battery swapping and transport of battery packs to recharging stations. In particular, disclosed embodiments comprise a battery-swapping support system that enables battery packs to be quickly swapped, potentially in the field. The battery-swapping support system may be mounted on a mobile equipment that can transport battery packs to and from other mobile equipment in the field.

18 Claims, 6 Drawing Sheets

MOBILE EQUIPMENT OPTIMIZED TO SUPPORT SWAPPABLE BATTERY MACHINERY

TECHNICAL FIELD

The embodiments described herein are generally directed to support swapping battery packs, and, more particularly, to mobile equipment optimized to support swapping battery packs between battery-powered machinery at industrial sites.

BACKGROUND

In some industrial contexts, such as construction, mining, farming, forestry, and the like, battery-powered mobile equipment may operate in remote locations, such as off-road locations, where no supporting infrastructure exists. Access to these sites can potentially be a complex task due to several factors specific to these environments. Mobile equipment often operate in demanding and dynamic conditions, requiring continuous usage throughout the day. The process of recharging the batteries of such mobile equipment can be time-consuming. Therefore, it becomes costly for businesses to operate a recharging process.

Traditionally, industrial sites may have limited infrastructure for charging mobile equipment. The availability of vehicles designed to replace battery packs on-site are limited and may not be suitable for most battery pack assemblies. Furthermore, the mobile equipment might be limited, requiring separate equipment tools to support the battery pack swapping. Chinese Patent No. CN212921200U describes an example of a battery replacement equipment platform.

In addition, the mobility of the equipment to assist in the battery swapping process poses logistical challenges. Mobile equipment may need to have a thermal management system to manage the heat generated during battery pack removal. Further, the equipment may need to be designed with adequate safety features in case of leaks from battery chemicals.

Accordingly, a mobile equipment optimized to support swappable battery machinery, which is capable of supporting battery swapping, would offer a variety of benefits. Chinese Patent No. CN107697037A and U.S. Pat. No. 10,340,709 describe examples of battery swapping support systems. The present disclosure is directed toward overcoming one or more of the problems discovered by the inventor.

SUMMARY

In an embodiment, a battery-swapping support system includes a lifting system configured to carry a battery pack; a load securing tool configured to secure the battery pack; and an interface connection, including: a battery charging adapter; a low voltage communication system; and a cooling system configured to cool down the battery pack, wherein the interface connection connects the battery-swapping support system to a mobile equipment.

In an embodiment, a battery-swapping support system includes a lifting system configured to carry a battery pack, including: a handling arm configuration; and a lifting device connected to the handling arm configuration, a load securing tool configured to secure the battery pack; and an interface connection, including: a battery charging adapter; a low voltage communication system; and a cooling system configured to cool down the battery pack, wherein the interface connection connects the battery-swapping support system to a mobile equipment.

In an embodiment, a mobile equipment comprising a battery swapping support system that includes: a lifting system configured to carry a battery pack, a load securing tool configured to secure the battery pack; and an interface connection, including: a battery charging adapter, a low voltage communication system; and a cooling system configured to cool down the battery pack, wherein the interface connection connects the battery-swapping support system to a mobile equipment.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
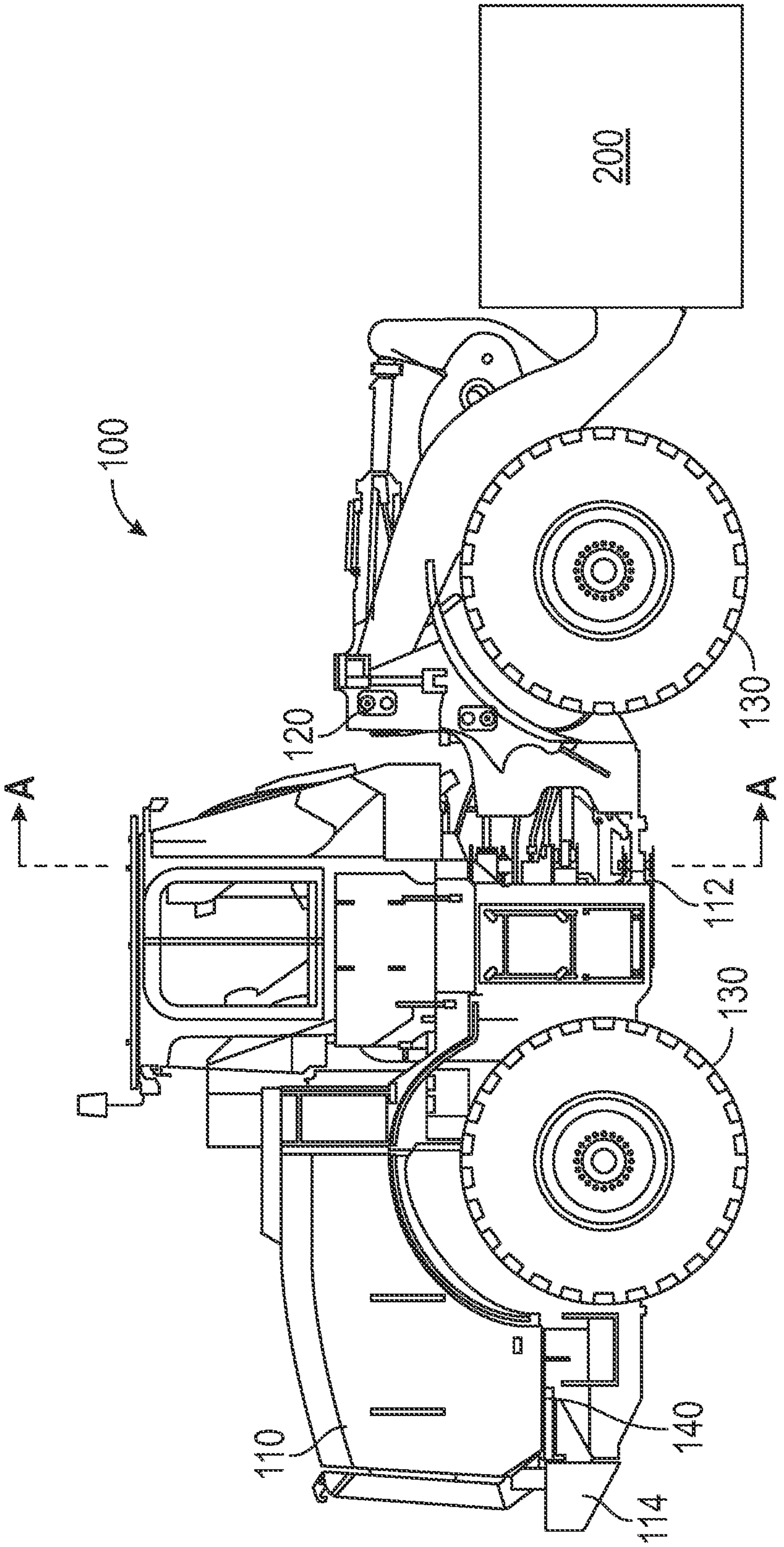
FIG. 1 illustrates a side view of a mobile equipment optimized to support swappable battery machinery, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. For clarity and ease of explanation, some surfaces and details may be omitted in the present description and figures. It should also be understood that the various components illustrated herein are not necessarily drawn to scale. In other words, the features disclosed in various embodiments may be implemented using different relative dimensions within and between components than those illustrated in the drawings.

FIG. 1 illustrates a side view of a mobile equipment 100 optimized to support swappable battery machinery, according to an embodiment. Mobile equipment 100 is illustrated as a modified wheel loader. However, mobile equipment 100 may be any equipment that is optimized to support swappable battery machinery. Other examples of mobile equipment 100 that could be modified to support swappable battery machinery include, without limitation, an excavator, dump truck, asphalt paver, backhoe loader, skid steer, track loader, cold planer, compactor, dozer, electric rope shovel, forest machine, hydraulic mining shovel, material handler, motor grader, pipe-layer, road reclaimer, telehandler, tractor-scraper, or the like. Mobile equipment 100 may be operated by a human (e.g., locally or remotely) and/or by an autonomous system.

In the illustrated example, mobile equipment 100 includes a rear portion 110 and a front portion 120 that includes a battery-swapping support system 200. Front portion 120 may be articulated with respect to rear portion 110, by virtue of a joint 112, such that front portion 120 is capable of rotating within a range of degrees, relative to rear portion 110, around an axis A. However, it should be understood that disclosed embodiments do not require mobile equipment 100 to comprise an articulated front portion 120. In an alternative example, mobile equipment 100 may comprise non-articulated front and rear portions (e.g., a single, integrated body frame).

Mobile equipment 100 may comprise at least one, and generally a plurality of, ground-engaging members 130. Ground-engaging members 130 are illustrated as wheels. In an alternative embodiment, ground-engaging members 130 may comprise a track or pair of tracks. More generally, ground-engaging member(s) 130 may comprise any mechanism for supporting mobile equipment 100 above the ground, and preferably moving mobile equipment 100 relative to the ground. Rear portion 110 of mobile equipment 100 includes a rear bumper 114 on the rear end. Rear portion 110 also includes a rear frame 140. Rear frame 140 may be shaped in u-shape or an angled-ended.

Figure 2:
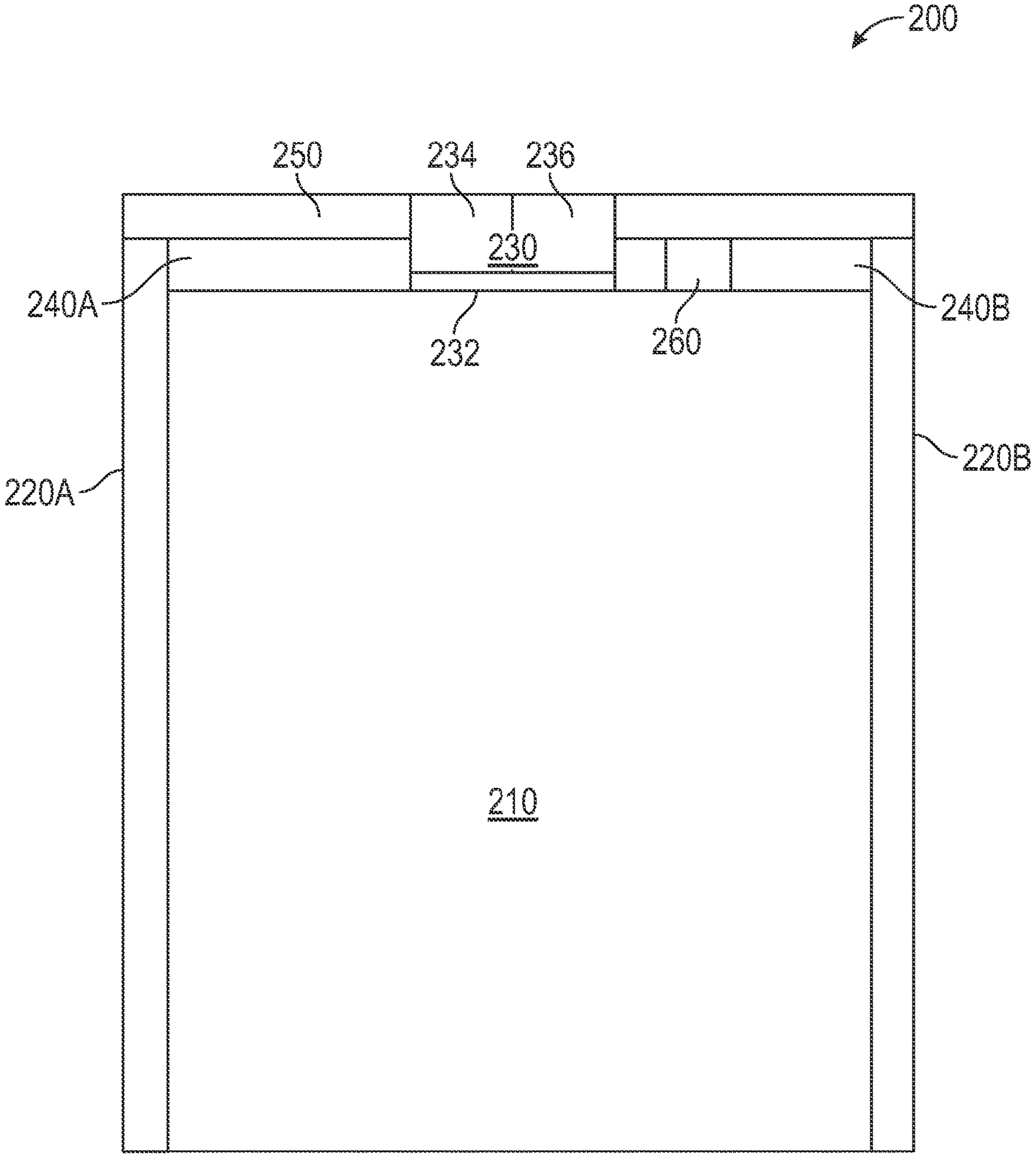
FIG. 2 illustrates a top-down schematic of a battery-swapping support system associated with a mobile equipment, according to an embodiment.

FIG. 2 illustrates a top-down schematic of a battery-swapping support system 200 associated with a mobile equipment 100, according to an embodiment. Battery-swapping support system 200 includes a lifting system 210, which is configured to support a battery pack 150, a load securing tool 220 (e.g., including 220A and 220B), and an interface connection 230 that connects battery-swapping support system 200 to mobile equipment 100. In an embodiment, interface connection 230 includes a battery charging adapter 232, a low-voltage communication system 234, and a cooling system 236. Although only one or two of each component is illustrated, it should be understood that battery-swapping support system 200 may comprise any number of each component. Battery-swapping support system 200 may be connected to or integrated into a mobile equipment 100. In addition, the components of battery-swapping support system 200 may be powered and controlled by mobile equipment 100.

As used herein, a reference numeral without an appended letter, but with the same numerical component as a reference numeral with an appended letter, will be used to refer to that component generically. For example, the term "bumper 240" may refer to either bumper 240A or bumper 240B, and the term "bumper 240" may refer collectively to bumpers 240A and 240B.

Figure 3A:
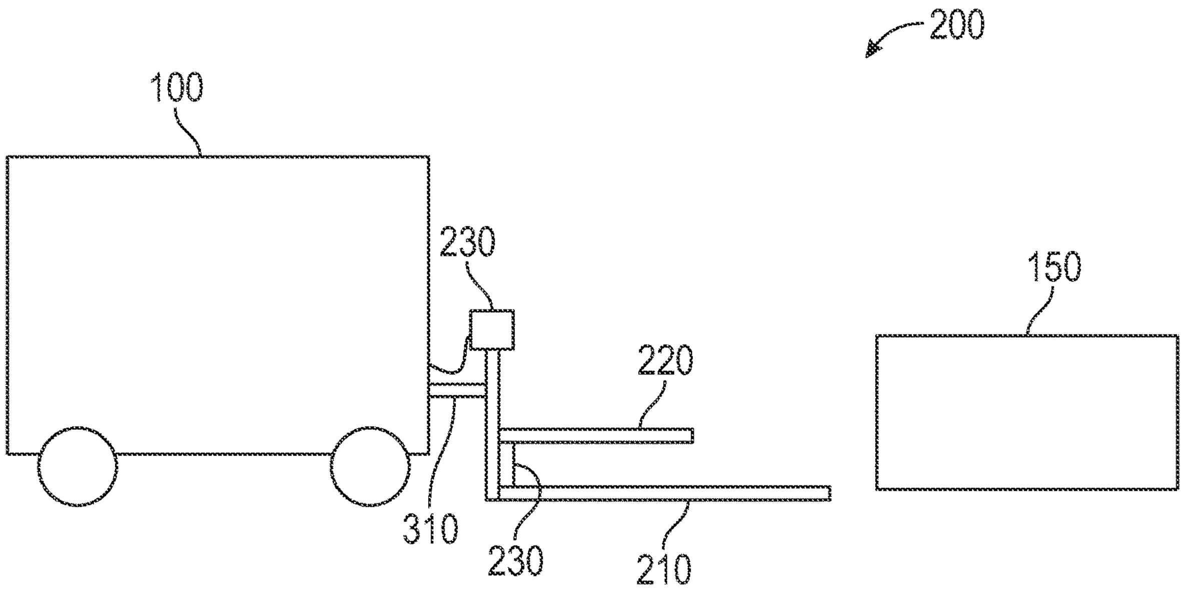
FIGS. 3A and 3B illustrate side views of a battery-swapping support system for a battery pack, according to an embodiment.
Figure 3B:
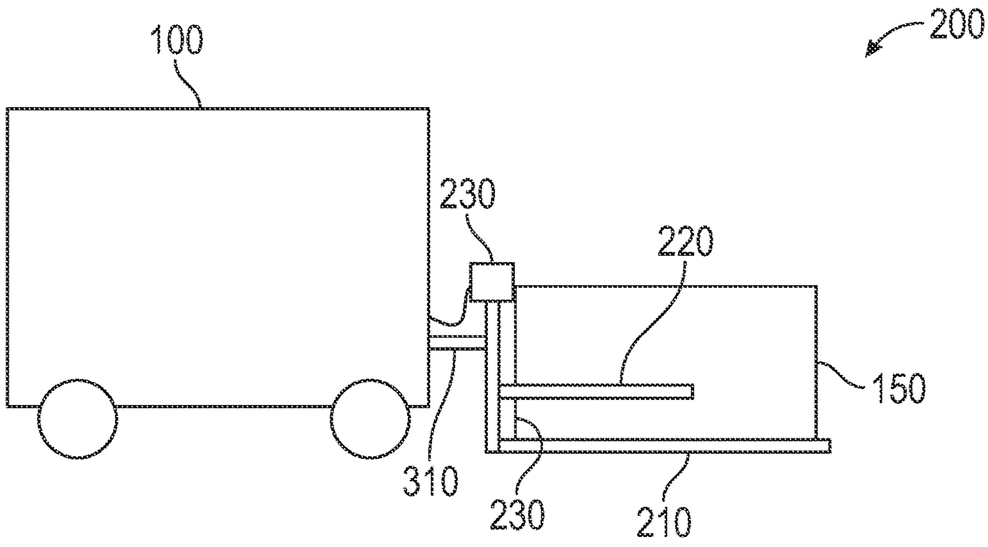

Lifting system 210 is configured to carry battery pack 150 (see FIG. 3B). Lifting system may include a forklift, crane, platform or any type of lifting mechanism capable of carrying battery pack 150, which enables lifting and moving of battery pack 150. Lifting system 210 may be mechanical, electrical, pneumatic, or hydraulic. Lifting system 210 may be designed to handle specific weight limits and sizes, which are determined by battery pack 150 intended for transport. To allow carrying different types of battery packs 150, lifting system 210 may be interchangeable or detachable, allowing for the adaptation to handle various sizes and weights of battery pack 150. For example, forklifts can be equipped with different fork lengths or attachments to accommodate different size or weights of battery pack 150. Cranes often have interchangeable hooks or slings that can be switched out depending on the weight and shape battery pack 150. Additionally, mobile equipment 100 may have adjustable boom or mast heights, allowing for the lifting of battery pack 150 at different elevations. Additionally, lifting system 210 may include hydraulic cylinders, winches, or similar devices that generate the force required to raise and lower battery pack 150. Furthermore, battery pack 150 may be retrieved from the bottom by utilizing the lowering function of lifting system 210.

Additional components of lifting system 210 may include bumpers 240 and a back end 250. Bumpers 240 in lifting system 210 may serve as a safety feature and provide functionality by helping to protect both the lifting system 210 itself, the surrounding environment, and battery pack 150. Positioned at the lower-rear end of the lifting system 210, bumper 240 acts as a shock absorber and impact-resistant barrier between battery pack 150 and back end 250. The primary function of bumper 240 is to absorb and dissipate the energy generated during collisions or accidental impacts. Back end 250 may allow a vertical movement of lifting system 210. For example, this may be accomplished through a mast in a forklift and facilitated by a hydraulic system.

Battery-swapping support system 200 may include a load securing tool 220. Mobile equipment 100 requires stability to prevent tipping over during lifting and transporting operations. Load securing tool 220 may include a specialized attachment designed to securely hold battery pack 150. A battery-swapping support system 200 that has a lifting system 210 (e.g., crane) may employ load securing tools 220 such as outriggers or stabilizer legs to enhance stability. Additionally, counterweights may be used in load securing tools 220 to balance the weight of the lifted battery pack 150 and prevent mobile equipment 100 from becoming top-heavy. Load securing tools 220 may be engineered to withstand the forces generated by battery pack 150 and the dynamics of the lifting process, ensuring battery-swapping support system 200 remains secure and operational. Load securing tool 220 may also incorporate mounting points and attachment areas for components of lifting system 210 and/or battery pack 150. Battery-swapping support system 200 may also use tilting and friction features, using the weight of battery pack 150 as a load securing tool 220.

Alternatively or additionally, battery-swapping support system 200 may comprise a frame configured to support battery pack 150. The frame may include a body, two arms extending from the body, wherein each of the two arms includes a first end, joined to the body, and a second end. The frame in lifting system 210 may provide structural integrity, stability, and support for the entire lifting operation of battery pack 150. The frame may connect various components and ensure their proper alignment and functionality. Additionally, the frame may help maintain the overall stability and balance of battery-swapping support system 200, preventing tipping or excessive swaying during lifting or movement. The frame may also incorporate mounting points and attachment areas for components of lifting system 210 and/or battery pack 150.

Interface connection 230 includes a battery charging adapter 232, a low-voltage communication system 234, and a cooling system 236. Interface connection 230 in battery-swapping support system 200 refers to the point of attachment between battery-swapping support system 200 and battery pack 150. Interface connection 230 enables the secure and reliable transfer of power, chemicals, and/or communication data from mobile equipment 100 to battery pack 150 being lifted and/or transported. Interface connection 230 may vary depending on the specific battery-swapping support system 200. In some cases, interface connection 230 can be a direct physical attachment. In other instances, interface connection 230 may involve a combination of mechanical, electrical, and/or hydraulic connections, such as quick-connect couplings, electrical connectors, or hydraulic hoses.

Battery charging adapter 232 may be wireless or hard-wired, depending on requirements of battery pack 150. For example, wireless battery charging adapter 232 may use electromagnetic fields to transfer power from battery charging adapter 232 to battery pack 150 without the need for physical electrical connections. Alternatively, hard-wired battery charging adapter 232 may involve a direct physical connection between battery charging adapter 232 and battery pack 150. Hard-wired battery charging adapter 232 may utilize connectors or terminals that are connected directly to battery pack 150. The choice between wireless and hard-wired battery charging adapters 232 depends on the requirements of the design in battery pack 150. Battery charging adapter 232 may include +DC High voltage and −DC high voltage.

Low-voltage communication system 234 operates using low voltage levels, typically in the range of a few volts or millivolts. Low-voltage communication system 234 may be designed to facilitate communication with battery-swapping support system 200 or components associated with battery-swapping support system 200, such as lifting system 210. Low-voltage communication system 234 may be configured to generate and/or communicate signals by mobile equipment 100 or battery-swapping support system 200 and components associated with battery-swapping support system 200, which can be in the form of digital or analog data. Further, low-voltage communication system 234 signals may be modulated, if necessary, to adapt to the characteristics of the communication medium. The signal may be transmitted through either wired or wireless channels, depending on the low-voltage communication system 234 design. At the receiving end, the signal may be captured and demodulated to recover the original information sent by mobile equipment 100 and/or battery-swapping support system 200. Examples of low-voltage communication systems 234 may include Ethernet systems using low voltage levels like 5 volts, USB (Universal Serial Bus) interfaces that operate at low voltages (typically 5 volts), RS-232 systems using low voltage levels ranging from −15 volts to +15 volts, RS-485 systems operating at around 5 volts for long-distance transmission, and inter-integrated circuit (I2C) and serial peripheral interface (SPI) systems both working at low voltage levels of 3.3 volts or lower.

Cooling system 236 may be designed to maintain the optimal operating temperature of the battery cells in battery pack 150, ensuring performance, safety, and longevity of the battery cells. Cooling system 236 may use several common cooling methods for battery pack 150. Cooling system 236 may circulate a coolant fluid through a network of tubes or channels in direct contact with battery cells of battery pack 150, dissipating heat through a radiator or heat exchanger. Another method may be air cooling using fans or blowers to circulate ambient air over battery pack 150, dissipating heat. Furthermore, cooling system 236 may use a phase change cooling or thermoelectric cooling. Cooling system 236 may vary depending on factors like battery chemistry, power requirements, operating conditions, and space availability in battery pack 150.

Battery-swapping support system 200 may further comprise a storage compartment 260. Storage compartment 260 may be a designated space or container designed to safely store batteries from battery pack 150 when the batteries are not in use or have been damaged. The purpose of storage compartment 260 is to provide a secure and organized area for keeping batteries, protecting them from damage or further damage and preventing any potential safety hazards. Storage compartment 260 can be constructed from non-conductive materials such as plastic or metal, which help to minimize the risk of accidental short circuits. Additionally, storage compartment 260 may be designed to safely store hazardous materials and transport damaged batteries. Storage compartment 260 may have a secure lid or cover to protect the batteries from dust, moisture, and other environmental elements that could potentially affect battery performance or safety.

FIGS. 3A and 3B illustrate side views of battery-swapping support system 200 for a battery pack 150, according to an embodiment. As previously described in connection with FIG. 2, battery-swapping support system 200 includes a lifting system 210, which is configured to support a battery pack 150, a load securing tool 220, and an interface connection 230 that electrically connects battery-swapping support system 200 to mobile equipment 100. In an embodiment, interface connection 230 includes a battery charging adapter 232, a low-voltage communication system 234, and a cooling system 236. These components may be similar or identical to those that have already been described herein, and therefore, will not be redundantly described herein.

Figure 5A:
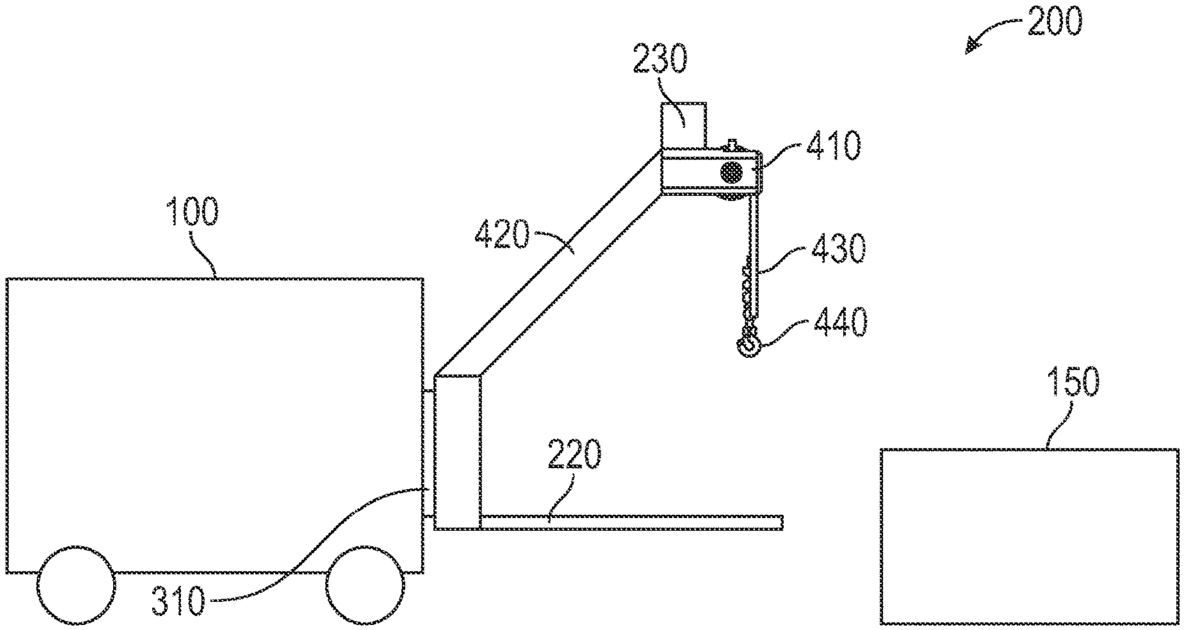
FIGS. 5A and 5B illustrate side views of a battery-swapping support system with a handling arm configuration for a battery pack, according to an embodiment.
Figure 5B:
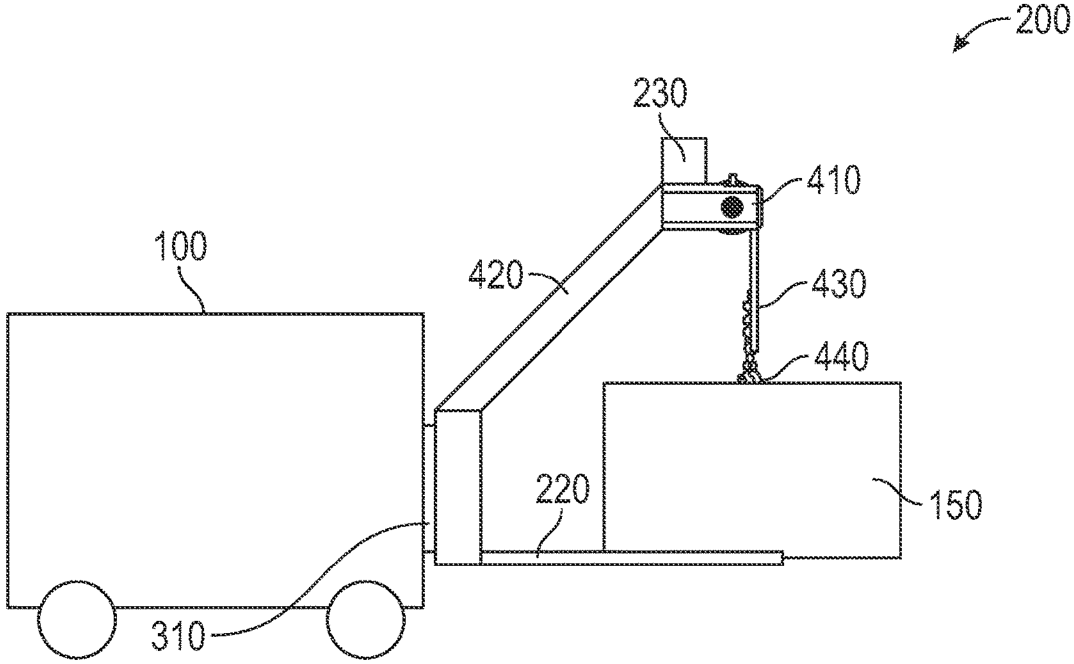

As illustrated in FIG. 3A, lifting system 210 may be designed to handle specific weight limits and sizes, which are determined by battery pack 150 intended for transport. To allow carrying different types of battery packs 150, lifting system 210 may be interchangeable or detachable, allowing for adaptation to handle various sizes and weights of loads. For example, forklifts can be equipped with different fork lengths or attachments to accommodate different sizes or weights of battery packs 150. FIG. 3A illustrates a configuration that may include a platform or forks to be able to retrieve the battery pack 150 from the bottom by utilizing the lowering function of lifting system 210. Additionally, lifting system 210 may include hydraulic cylinders, winches, or similar devices that generate the force required to raise and lower battery pack 150. Alternatively, lifting system 210 may allow carrying battery pack 150 by the sides. Lifting systems 210 that carry battery pack 150 by the sides lift and transport battery pack 150 by grasping them from the sides rather than from the bottom, in contrast to lifting from the top as seen in FIGS. 5A and 5B.

As illustrated in FIG. 3B, battery pack 150 may be secured in lifting system 210 with load securing tools 220 that can be engineered to withstand the forces generated by battery pack 150 and the dynamics of the lifting or transportation process, ensuring battery-swapping support system 200 remains secure and operational. Load securing tool 220 may include mounting points and attachment areas for components of lifting system 210 and/or battery pack 150. Lifting system 210 can use the gravity and friction of battery pack 150 as a load securing tool 220.

FIGS. 3A and 3B illustrate a locking mechanism 310 that connects and secures battery-swapping support system 200 to mobile equipment 100. Locking mechanism 310 may comprise a combination of mechanical components and safety features. Battery-swapping support system 200 may be compatible with various types of locking mechanisms 310. For example, locking mechanism 310 may include pin locking mechanisms, hook latch mechanisms, twist lock mechanisms, wedge locks, quick-release mechanisms, hydraulic locking mechanisms, or combinations thereof, or any mechanism that serves a similar process to connect and secure battery-swapping support system 200 to mobile equipment 100.

Further, FIGS. 3A and 3B illustrate how the power source for battery-swapping support system 200 can be provided through mobile equipment 100. In many cases, mobile equipment 100 may rely on internal combustion engines fueled by gasoline, diesel, or alternative fuels like natural gas or propane. In these instances, mobile equipment 100 can generate mechanical power that is used to drive hydraulic or electric systems, which can be employed in battery-swapping support system 200. Alternatively, electric mobile equipment 100 can be powered by batteries or external power sources can be used to power battery-swapping support system 200.

Figure 4:
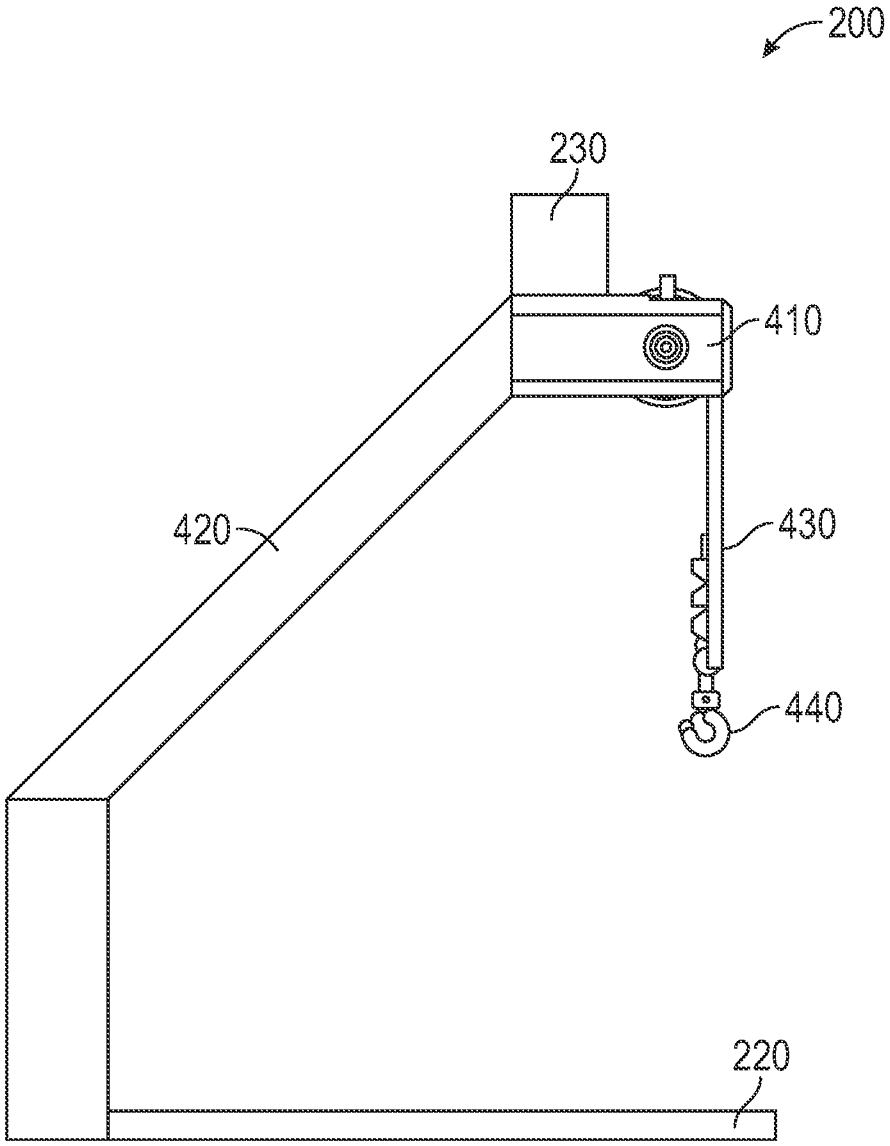
FIG. 4 illustrates a side view schematic of a battery-swapping support system with a handling arm configuration associated with a mobile equipment, according to an embodiment.

FIG. 4 illustrates a side view schematic of a battery-swapping support system 200 with a handling arm configuration 420 associated with a mobile equipment 100, according to an embodiment. Battery-swapping support system 200 includes a lifting system 410, which is configured to carry a battery pack 150 and including a handling arm configuration 420 and a lifting device 430 connected to the handling arm configuration 420. Further, battery-swapping support system 200 includes a load securing tool 220, and an interface connection 230 that connects battery-swapping support system 200 to mobile equipment 100. In an embodiment, interface connection 230 includes a battery charging adapter 232, a low-voltage communication system 234, and a cooling system 236 (as described in connection with FIG. 2). These components may be similar or identical to those that have already been described herein, and therefore, will not be redundantly described herein.

Lifting system 410 includes handling arm configuration 420, which is a mechanical system designed to manipulate battery packs 150 with precision and control, and lifting device 430. Lifting system 410 may be a mechanical, electrical, pneumatic, and/or hydraulic system designed to efficiently lift and transport battery pack 150. For example, lifting system 410 can include one or more cranes consisting of several key components, including the boom, counterweights, hoist, trolley, and/or the like, which can be operated from an operator's cabin.

Handling arm configuration 420 may comprise or consist of a series of interconnected segments or links, typically equipped with joints that allow for movement. Handling arm configuration 420 segments may be connected by joints that enable rotation or extension. Handling arm configuration 420 is connected to mobile equipment 100 through a locking mechanism (e.g., locking mechanism 310) that connects and secures battery-swapping support system 200 to mobile equipment 100. Handling arm configuration 420 may comprise multiple joints that can be actuated using various mechanisms, such as electric motors, hydraulic systems, or pneumatic systems. Actuators may provide the necessary power to move handling arm configuration 420 segments, allowing them to rotate, extend, or pivot as required.

Further, lifting system 410 includes lifting device 430, which may include an attachment point 440. Lifting device 430 is designed to provide mechanical advantage and support when lifting, hoisting, or suspending battery pack 150. Lifting device 430 can include cables, chains, slings, or other rigging equipment. Additionally, lifting device can include grab buckets, or clamshell buckets, designed to lift battery pack 150. Alternatively, lifting device 430 can include magnetic devices and/or C-hooks designed for handling cylindrical battery packs 150. In some instances, lifting device 150 can comprise a pallet lifter when battery pack 150 is on top of a pallet or other transport structure.

Lifting device 430 can feature various attachment points 440 that are crucial for securely connecting and lifting battery pack 150. For example, the attachment point 440 may include a hook, available in different shapes and sizes, such as a clevis hook, grab hook, or eye hook. On the other hand, attachment point 440 may be a shackle, which is a U-shaped metal connector that can be linked to corresponding attachment points on battery pack 150. Other types of attachment points 440 may include welded connections, which offer permanent attachment points 440 created by welding metal components together that include rings and eyelets, usually welded or bolted onto battery pack 150 or lifting device 430, and provide circular or oval-shaped attachment points 440. Plates and lugs, often welded onto battery pack 150 or lifting device 430, may provide flat or shaped attachment points 440 with holes or slots for connecting hooks, chains, or other rigging equipment.

FIGS. 5A and 5B illustrate side views of battery-swapping support system 200 with a handling arm configuration 220 lifting system for a battery pack, according to an embodiment. Battery-swapping support system 200 includes a lifting system 410, which is configured to carry a battery pack 150 and including a handling arm configuration 420 and a lifting device 430 connected to the handling arm configuration 420. Further, battery-swapping support system 200 includes a load securing tool 220, and an interface connection 230 that connects battery-swapping support system 200 to mobile equipment 100. In an embodiment, interface connection 230 includes a battery charging adapter 232, a low-voltage communication system 234, and a cooling system 236. These components may be similar or identical to those that have already been described herein, and therefore, will not be redundantly described herein.

As illustrated in FIG. 5A, lifting system 410 may be designed to handle specific weight limits and sizes, which are determined by the battery pack 150 intended for transport. To allow carrying different types of battery packs 150, lifting system 410 may be interchangeable or detachable, allowing for the adaptation to handle various sizes and weights of loads. For example, cranes can be equipped with different lifting devices 430 lengths or attachments to accommodate different sizes or weights in battery packs 150. FIG. 5A illustrates a configuration that may include lifting device 430 and attachment point 440 to be able to retrieve battery pack 150 from the top by utilizing the lowering function of lifting system 410, lifting device 430, and attachment point 440. Additionally, lifting system 410 may include hydraulic cylinders, winches, or similar devices that generate the force required to raise and lower battery pack 150.

As illustrated in FIG. 5B, battery pack 150 may be secured in lifting system 410 with load securing tools 220 that can be engineered to withstand the forces generated by battery pack 150 and the dynamics of the lifting or transport process, ensuring battery-swapping support system 200 remains secure and operational. Load securing tool 220 may include mounting points and attachment areas for components of lifting system 410 and/or battery pack 150. Lifting system 410 can use attachment points 440 and may be assisted by load securing tool 220 in the safe transport of battery pack 150.

FIGS. 5A and 5B illustrate locking mechanism 310 that connects and secures battery-swapping support system 200 to mobile equipment 100 via handling arm configuration 420. Locking mechanism 310 may comprise a combination of mechanical components and safety features. Handling arm configuration 420 may be compatible with various types of locking mechanisms 310. For example, locking mechanism 310 may include pin locking mechanisms, hook latch mechanisms, twist lock mechanisms, wedge locks, quick-release mechanisms, hydraulic locking mechanisms, or combinations thereof, or any mechanism that serves a similar process to connect and secure handling arm configuration 420 to mobile equipment 100 and ensure a safe transportation using battery-swapping support system 200.

Figure 6:
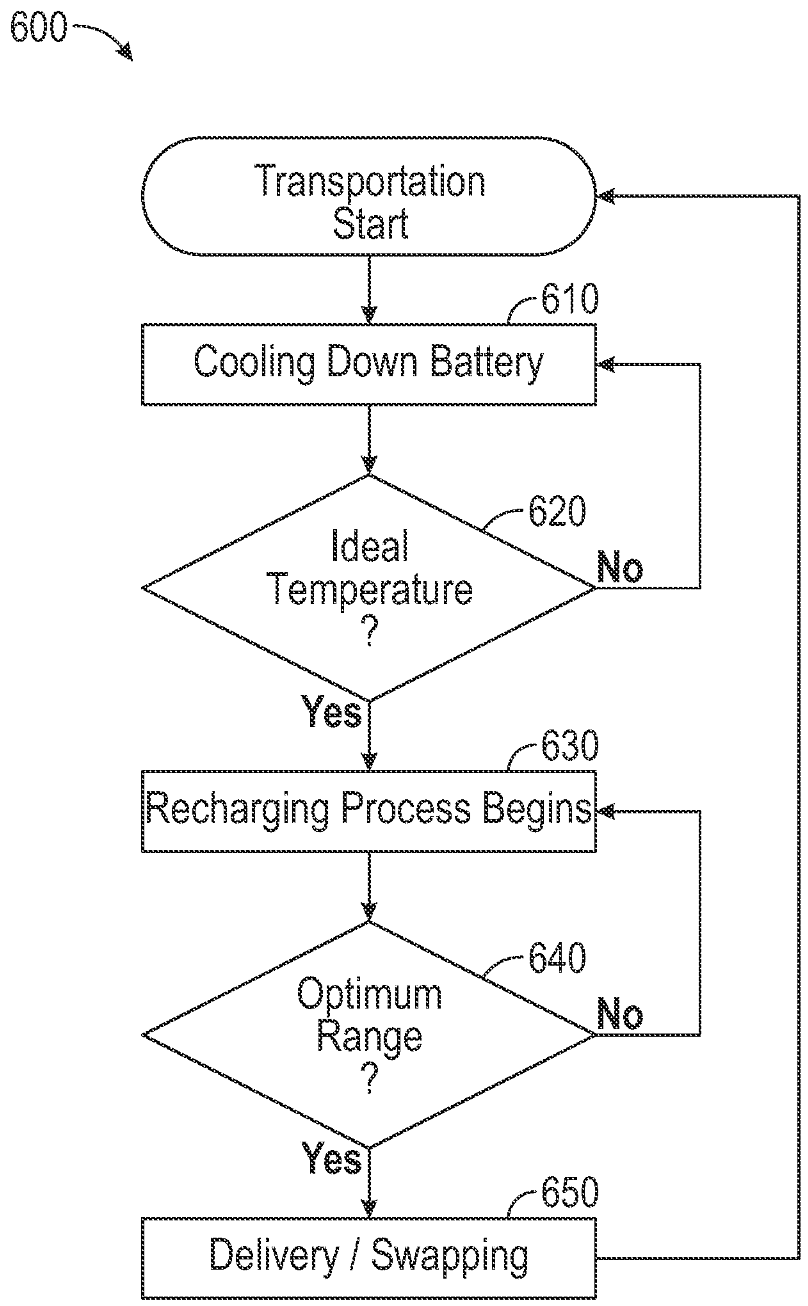
FIG. 6 illustrates a transportation process associated with a battery-swapping support system, according to an embodiment.

FIG. 6 illustrates transportation process 600 with a battery-swapping support system 200, according to an embodiment. Transportation process 600 may be implemented with the assistance of battery-swapping support system 200 including a cooling subprocess 610 and recharging subprocess 630. Ideal temperature measurement 620 may be an indicator for cooling subprocess 610 to proceed to recharging process 630. Optimum state of charge 640 may be reached during transportation process 600 so that when battery pack 150 is connected to the recharging station, the total charge time is reduced.

Although FIG. 6 shows example blocks of transportation process 600, in some implementations, transportation process 600 may include additional blocks, fewer blocks, different blocks, or differently arranged blocks than those depicted in FIG. 6. Additionally, or alternatively, two or more of the blocks of transportation process 600 may be performed in parallel. In some examples, transportation process 600, or one or more blocks thereof, may be configured to deliver battery pack 150 to mobile equipment 100. For example, cooling subprocess 610 may be implemented when the battery pack 150 is being transferred from the charger and/or to the mobile equipment 100. For example, cooling subprocess may be configured to help lower internal battery temperatures that may have risen due to the rapid charging. In some other examples, transportation process 600, or one or more blocks thereof, may be configured to deliver battery pack 150 to the battery charger. For example, recharging subprocess 630 may be implemented when the battery pack 150 is being transferred from the mobile equipment 100 and/or to the charger.

In cooling subprocess 610, cooling system 236 may use several common cooling methods for battery pack 150. In particular, cooling system 236 may be designed to maintain the ideal temperature measurement 620 of battery pack 150, ensuring performance, safety, and longevity of the battery cells. For example, cooling system 236 may circulate a coolant fluid through a network of tubes or channels in direct contact with battery cells of battery pack 150, dissipating heat through a radiator or heat exchanger. Another method may be air cooling using fans or blowers to circulate ambient air over battery pack 150, dissipating heat. Furthermore, cooling subprocess 610 may use a phase change cooling or thermoelectric cooling. Cooling subprocess 610 may vary depending on factors like battery chemistry, power requirements, operating conditions, and space availability in battery pack 150. As well, environmental factors may affect the cooling subprocess 610 requirements while in transportation process 600.

Ideal temperature measurement 620 in battery pack 150 may be essential for assessing performance and safety while in transportation process 600. Different methods can be employed for temperature monitoring and ensuring ideal temperature measurement 620, such as contact thermocouples, infrared thermography, internal temperature sensors, thermal imaging cameras, resistance temperature detectors (RTDs), and fiber optic temperature sensors. Ideal temperature measurement 620 may be directly intercommunicated to cooling system 236 to control temperature during cooling subprocess 610. Intercommunication between ideal temperature measurement 620 and cooling subprocess 610 may maintain a reliable and efficient constant temperature to ensure proper recharging subprocess 630, and to ensure maximum efficiency while in transportation process 600.

In recharging subprocess 630, battery pack 150 is raised to an optimum state of charge 640 so that when it is connected to the charging station, the total charge time is reduced. Optimum state of charge 640 is achieved during recharging subprocess 630 in transportation process 600. Battery pack 150 may offer a trickle charging phase. In this stage, a low current is maintained to keep battery pack 150 fully charged and compensate for any self-discharge. Throughout recharging subprocess 630, battery pack 150 voltage, current, and temperature may be monitored by the battery charger or a battery management system (BMS). Recharging subprocess 630 is terminated when the battery reaches its full capacity or a predetermined threshold that indicates optimum state of charge 640. Preferably, delivery/swapping 650 will occur with battery pack 150 at optimum state of charge 640.

INDUSTRIAL APPLICABILITY

In some industrial contexts, battery-powered mobile equipment 100 may operate in remote locations, including off-road locations. It takes significant time for these mobile equipment 100 to travel to a recharging station to recharge their battery packs 150. Electric mobile equipment 100 often operate in demanding and dynamic conditions, requiring continuous usage throughout the day. Accordingly, disclosed mobile equipment 100, optimized to support swappable battery machinery, which is capable of supporting battery swapping, offers a variety of benefits.

The battery-swapping support system 200 includes a lifting system 210, which is configured to support a battery pack 150, a load securing tool 220, and an interface connection 230 that connects battery-swapping support system 200 to mobile equipment 100. In an embodiment, interface connection 230 includes a battery charging adapter 232, a low-voltage communication system 234, and a cooling system 236. Although only one or two of each component is illustrated, it should be understood that battery-swapping support system 200 may comprise any number of each component, including a plurality of one or more components. Battery-swapping support system 200 may be connected to or integrated into a mobile equipment 100. In addition, the components of battery-swapping support system 200 may be powered by mobile equipment 100.

The ability to quickly swap battery packs 150, for example in the field, provides increased productivity. For instance, mobile equipment 100 no longer need to leave a work area or interrupt tasks to find a recharging station. Additionally, mobile equipment 100 is only out of service for as long as it takes to swap battery pack 150, as opposed to being out of service for as long as it takes to recharge battery pack 150, which may be a significant time period.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in an electric mobile equipment, it will be appreciated that it can be implemented in various other types of equipment and machines with batteries, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A battery-swapping support system comprising:
- a lifting system configured to carry a battery pack;
- a load securing tool configured to secure the battery pack; and
- an interface connection supported by the lifting system, including:
  - a battery charging adapter;
  - a low voltage communication system; and
  - a cooling system configured to cool down the battery pack,
- wherein the interface connection defines a point of attachment between the battery-swapping support system and the battery pack for a transfer of power, chemicals, and communication data,
- wherein the interface connection connects the battery-swapping support system to mobile equipment enabling the mobile equipment to increase a charge of the battery pack during transportation of the battery pack;
- wherein the load securing tool is configured to mechanically secure the battery pack to maintain the interface connection in an operational state for the transfer of the power, the chemicals, and the communication data during the transportation;
- wherein the cooling system is configured to maintain a temperature of the battery pack during the transportation; and wherein the battery charging adapter is configured to increase the charge of the battery pack during the transportation.

2. The battery-swapping support system of claim 1, wherein the battery-swapping support system is powered by the mobile equipment.

3. The battery-swapping support system of claim 1, wherein the battery-swapping support system is controlled through the mobile equipment.

4. The battery-swapping support system of claim 1, wherein the battery-swapping support system is configured to retrieve the battery pack from a bottom of the battery pack.

5. The battery-swapping support system of claim 1, further comprising a frame configured to support the battery pack, wherein the frame includes:
- a body; and
- two arms extending from the body, wherein each of the two arms includes a first end, joined to the body, and a second end.

6. The battery-swapping support system of claim 1, further comprising a platform configured to carry the battery pack.

7. The battery-swapping support system of claim 1, further comprising a compartment to store one or more batteries of the battery pack.

8. The battery-swapping support system of claim 7, wherein the compartment is configured to transport hazardous materials.

9. The battery-swapping support system of claim 1, wherein the battery-swapping support system is detachable from the mobile equipment.

10. The battery-swapping support system of claim 1, further comprising a locking mechanism,
- wherein the locking mechanism connects and secures the battery-swapping support system to the mobile equipment.

11. The battery-swapping support system of claim 1, wherein the lifting system includes:
- a handling arm configuration; and
- a lifting device connected to the handling arm configuration.

12. The battery-swapping support system of claim 11, wherein the lifting device is a crane.

13. The battery-swapping support system of claim 1, wherein the battery charging adapter is wireless.

14. A battery-swapping support system comprising:
- a lifting system configured to carry a battery pack, including:
  - a handling arm configuration; and
  - a lifting device connected to the handling arm configuration,
- a load securing tool, including at least one of a mounting point and an attachment area configured to secure the battery pack to the load securing tool;
- an interface connection supported by the lifting system, including:
  - a battery charging adapter;
  - a low voltage communication system configured to operate within a range of about negative twenty volts to about twenty volts to transmit information from the battery pack to another device; and
  - a cooling system configured to cool down the battery pack,
- wherein the interface connection defines a point of attachment between the battery-swapping support system and the battery pack for a transfer of power, chemicals, and communication data,
- wherein the interface connection connects the battery-swapping support system to mobile equipment enabling the mobile equipment to increase a charge of the battery pack during transportation of the battery pack to a battery charger;
- wherein the load securing tool is configured to mechanically secure the battery pack to maintain the interface connection in an operational state for the transfer of the power, the chemicals, and the communication data during the transportation;
- wherein the cooling system is configured to maintain a temperature of the battery pack during the transportation; and wherein the battery charging adapter is configured to increase the charge of the battery pack during the transportation such that total charge time at the battery charger is reduced; and a locking mechanism to secure the battery-swapping support system to the mobile equipment wherein:

the battery-swapping support system is selectively detachable from the mobile equipment, and the battery-swapping support system is powered by the mobile equipment.

15. The battery-swapping support system of claim 14, wherein the lifting device is a crane.

16. A mobile equipment comprising a battery-swapping support system that includes:

a lifting system configured to carry a battery pack, a load securing tool configured to secure the battery pack;

an interface connection supported by the lifting system to connect the battery pack to the mobile equipment, including:

a battery charging adapter;

a low voltage communication system; and a cooling system configured to cool down the battery pack; and a locking mechanism to secure the battery-swapping support system to the mobile equipment, wherein the interface connection defines a point of attachment between the battery-swapping support system and the battery pack for a transfer of power, chemicals, and communication data, and wherein the interface connection selectively connects the battery-swapping support system to the mobile equipment to increase a charge of the battery pack during transportation of the battery pack to a battery charger;

wherein the load securing tool is configured to mechanically secure the battery pack to maintain the interface connection in an operational state for the transfer of the power, the chemicals, and the communication data during the transportation;

wherein the cooling system is configured to maintain a temperature of the battery pack during the transportation; and wherein the battery charging adapter is configured to increase the charge of the battery pack during the transportation such that total charge time at the battery charger is reduced.

17. The mobile equipment of claim 16, wherein the lifting system includes:

a handling arm configuration; and a lifting device connected to the handling arm configuration.

18. The mobile equipment of claim 16, wherein the battery-swapping support system is detachable from the mobile equipment.

* * * * *